(12) United States Patent
Yamamoto et al.

(10) Patent No.: US 12,409,415 B2
(45) Date of Patent: Sep. 9, 2025

(54) CATALYST FOR PURIFICATION OF EXHAUST GAS

(71) Applicant: CATALER CORPORATION, Kakegawa (JP)

(72) Inventors: Toshio Yamamoto, Nagakute (JP);
Akira Morikawa, Nagakute (JP);
Satoru Katoh, Nagakute (JP);
Masahide Miura, Toyota (JP);
Nobusuke Kabashima, Toyota (JP);
Nobuyuki Takagi, Toyota (JP);
Takashi Onozuka, Kakegawa (JP);
Mitsuyoshi Okada, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 513 days.

(21) Appl. No.: 17/925,982

(22) PCT Filed: Jun. 8, 2021

(86) PCT No.: PCT/JP2021/021750
§ 371 (c)(1),
(2) Date: Nov. 17, 2022

(87) PCT Pub. No.: WO2022/009590
PCT Pub. Date: Jan. 13, 2022

(65) Prior Publication Data
US 2023/0201770 A1    Jun. 29, 2023

(30) Foreign Application Priority Data
Jul. 9, 2020   (JP) .................. 2020-118662

(51) Int. Cl.
| | | |
|---|---|---|
| *B01D 53/94* | (2006.01) | |
| *B01J 23/40* | (2006.01) | |
| *B01J 23/63* | (2006.01) | |
| *B01J 35/40* | (2024.01) | |
| *B01J 35/64* | (2024.01) | |
| *B01J 35/66* | (2024.01) | |
| *B01J 37/00* | (2006.01) | |
| *B01J 37/02* | (2006.01) | |
| *F01N 3/28* | (2006.01) | |

(52) U.S. Cl.
CPC .......... *B01D 53/9413* (2013.01); *B01J 23/40* (2013.01); *B01J 23/63* (2013.01); *B01J 35/40* (2024.01); *B01J 35/657* (2024.01); *B01J 35/66* (2024.01); *B01J 37/0018* (2013.01); *B01J 37/0036* (2013.01); *B01J 37/0215* (2013.01); *B01J 37/0228* (2013.01); *B01J 37/0248* (2013.01); *F01N 3/28* (2013.01); B01D 2255/1025 (2013.01); B01D 2255/2061 (2013.01); B01D 2255/2063 (2013.01); B01D 2255/20715 (2013.01); B01D 2255/2092 (2013.01); B01D 2255/407 (2013.01); B01D 2255/9202 (2013.01); B01D 2255/9205 (2013.01)

(58) Field of Classification Search
None
See application file for complete search history.

(56) References Cited

U.S. PATENT DOCUMENTS

| 2014/0220294 A1 | 8/2014 | Ono et al. |
| 2018/0252132 A1 | 9/2018 | Suzuki et al. |

FOREIGN PATENT DOCUMENTS

| CN | 103796758 A | | 5/2014 |
| CN | 107427826 A | | 12/2017 |
| EP | 3 275 544 A1 | | 1/2018 |
| EP | 3 736 035 A1 | | 11/2020 |
| JP | 4963799 B2 | * | 6/2012 |
| JP | 2012-240027 A | | 12/2012 |
| JP | 2017-159226 A | | 9/2017 |
| JP | 2019013895 A | * | 1/2019 |
| WO | 2016/136560 A1 | | 9/2016 |

OTHER PUBLICATIONS

Machine Translation, JP-2019013895-A, Oyama N, Jan. 31, 2019 (Year: 2019).*
Machine Translation, JP-4963799-B2, Oki D, Jun. 27, 2012 (Year: 2012).*
Nov. 22, 2023 Office Action issued in Chinese Patent Application No. 202180042502.9.
Sep. 14, 2023 extended Search Report issued in European Patent Application No. 21836990.8.
Jul. 20, 2021 International Search Report issued in Patent Application No. PCT/JP2021/021750.

* cited by examiner

Primary Examiner — Coris Fung
Assistant Examiner — Jialan Zhang
(74) Attorney, Agent, or Firm — Oliff PLC

(57) ABSTRACT

A catalyst for purification of exhaust gas including a substrate, and a catalyst coat layer which is formed on a surface of the substrate and contains catalyst particles, wherein the catalyst coat layer has an average thickness ranging 25 to 150 μm, a void fraction, as determined by scanning electron microscope observation of a cross-section of the catalyst coat layer, ranging 1.5 to 8.0% by volume, 60 to 90% by volume of all voids in the catalyst coat layer are high-aspect ratio pores which have equivalent circle diameters ranging 2 to 50 μm in a cross-sectional image of a cross-section of the catalyst coat layer perpendicular to a flow direction of exhaust gas in the substrate, and which ratios of 5 or higher, the high-aspect ratio pores have an average aspect ratio ranging 10 to 50, and a noble metal is supported on the entire catalyst coat layer.

7 Claims, No Drawings

CATALYST FOR PURIFICATION OF EXHAUST GAS

TECHNICAL FIELD

The present invention relates to a catalyst for purification of exhaust gas, and more particularly to a catalyst for purification of exhaust gas having a catalyst coat layer formed on a surface of a substrate.

BACKGROUND ART

Conventionally, as catalysts for purification of exhaust gas mounted on automobiles and the like, three-way catalysts, oxidation catalysts, NOx storage reduction-type catalysts, and the like have been developed to remove harmful components such as harmful gases (hydrocarbons (HC), carbon monoxide (CO), nitrogen oxides (NOx)) contained in exhaust gas.

For example, International Publication No. WO2016/136560 (PTL 1) discloses a catalyst for purification of exhaust gas including a substrate, and a catalyst coat layer which is formed on a surface of the substrate and which contains catalyst particles, wherein the catalyst coat layer has an average thickness in a range of 25 to 160 μm, and a void fraction in a range of 50 to 80% by volume as measured by a weight-in-water method; 0.5 to 50% by volume of all voids in the catalyst coat layer are high-aspect ratio pores which have equivalent circle diameters in a range of 2 to 50 μm in a cross-sectional image of a cross-section of the catalyst coat layer perpendicular to a flow direction of exhaust gas in the substrate, and which have aspect ratios of 5 or higher; and the high-aspect ratio pores have an average aspect ratio in a range of 10 to 50. In addition, PTL 1 states that this catalyst for purification of exhaust gas exhibits excellent catalytic performance even in the high-load region with a high gas flow rate.

CITATION LITERATURE

Patent Literature

[PTL 1] International Publication No. 2016/136560

SUMMARY OF INVENTION

Technical Problem

However, a catalyst coat layer with a high void fraction causes a problem that when the catalyst coating amount is increased, the catalyst coat layer becomes thicker, resulting in a larger pressure drop. In addition, a catalyst coat layer with a high void fraction also causes a problem that when the catalyst coat layer is made thinner, the catalyst coating amount decreases, resulting in insufficient catalytic performance. Furthermore, there is a problem that when the void fraction of the catalyst coat layer is lowered in order to reduce the thickness of the catalyst coat layer with the catalyst coating amount increased, sufficient catalytic performance is not achieved.

The present invention has been made in view of the problems of the related art described above, and an object thereof is to provide a catalyst for purification of exhaust gas which has a thin thickness of the catalyst coat layer and exhibits a relatively high catalytic performance even when the catalyst coating amount is increased.

Solution to Problem

The present inventors have made earnest studies to achieve the above object, and consequently have found that, when a catalyst coat layer with a low void fraction is provided with high-aspect ratio pores with a specific equivalent circle diameter and a specific aspect ratio formed at a high ratio to all voids in the catalyst coat layer, it is possible to obtain a catalyst for purification of exhaust gas which has a thin thickness of the catalyst coat layer and exhibits a relatively high catalytic performance even when the catalyst coating amount is increased. Thus, the present invention has been completed.

Specifically, a catalyst for purification of exhaust gas of the present invention comprises:

a substrate, and a catalyst coat layer which is formed on a surface of the substrate and which contains catalyst particles, wherein the catalyst coat layer has an average thickness in a range of 25 to 150 μm, a void fraction, as determined by scanning electron microscope (SEM) observation of a cross-section of the catalyst coat layer, is in a range of 1.5 to 8.0% by volume, 60 to 90% by volume of all voids in the catalyst coat layer are high-aspect ratio pores which have equivalent circle diameters in a range of 2 to 50 μm in a cross-sectional image of a cross-section of the catalyst coat layer perpendicular to a flow direction of exhaust gas in the substrate, and which have aspect ratios of 5 or higher, the high-aspect ratio pores have an average aspect ratio in a range of 10 to 50, and a noble metal is supported on the entire catalyst coat layer.

In the catalyst for purification of exhaust gas of the present invention, it is preferable that the void fraction of the catalyst coat layer is in a range of 1.6 to 7.0% by volume.

Furthermore, in the catalyst for purification of exhaust gas of the present invention, it is preferable that 70 to 90% by volume of all the voids in the catalyst coat layer are the high-aspect ratio pores, and the high-aspect ratio pores have an average aspect ratio in a range of 10 to 35.

Moreover, in the catalyst for purification of exhaust gas of the present invention, it is preferable that the coating amount of the catalyst coat layer is in a range of 50 to 300 g/L per unit volume of the substrate.

Note that although it is not necessarily clear why the catalyst for purification of exhaust gas of the present invention has a thin thickness of the catalyst coat layer and exhibits a relatively high catalytic performance even when the catalyst coating amount is increased, the present inventors infer as follows. Specifically, the catalyst for purification of exhaust gas of the present invention has a catalyst coat layer with a low void fraction. A catalyst coat layer with a low void fraction is dense and has a thin thickness, and thus makes it possible to suppress pressure drop, but a conventional dense catalyst coat layer cannot exhibit sufficient catalytic performance due to insufficient gas diffusion into the interior of the layer. On the other hand, in the catalyst for purification of exhaust gas of the present invention, the aforementioned high-aspect ratio pores are formed in such a dense catalyst coat layer at a high ratio to all the voids. Therefore, compared to the conventional dense catalyst coat layer, the diffusivity of gas into the interior of the layer is superior, and the opportunities for contact between the noble metals (catalytically active sites) supported inside the catalyst coat layer and the gas are increased, so that in a relatively high catalytic performance is exhibited.

Advantageous Effects of Invention

According to the present invention, it is possible to obtain a catalyst for purification of exhaust gas which has a thin thickness of the catalyst coat layer and exhibits a relatively high catalytic performance even when the catalyst coating amount is increased.

DESCRIPTION OF EMBODIMENTS

Hereinafter, the present invention is described in detail according to the preferred embodiments thereof.

A catalyst for purification of exhaust gas of the present invention comprises:
a substrate, and
a catalyst coat layer which is formed on a surface of the substrate and which contains catalyst particles, wherein
the catalyst coat layer has an average thickness in a range of 25 to 150 μm,
a void fraction, as determined by scanning electron microscope (SEM) observation of a cross-section of the catalyst coat layer, is in a range of 1.5 to 8.0% by volume,
60 to 90% by volume of all voids in the catalyst coat layer are high-aspect ratio pores which have equivalent circle diameters in a range of 2 to 50 μm in a cross-sectional image of a cross-section of the catalyst coat layer perpendicular to a flow direction of exhaust gas in the substrate, and which have aspect ratios of 5 or higher,
the high-aspect ratio pores have an average aspect ratio in a range of 10 to 50, and
a noble metal is supported on the entire catalyst coat layer.

(Substrate)

The substrate in the catalyst for purification of exhaust gas of the present invention is not particularly limited, and it is possible to mention known substrates which can be used as a substrate for a catalyst for purification of exhaust gas, among which a honeycomb-shaped substrate is preferable. The honeycomb-shaped substrate is not particularly limited, and it is possible to mention known honeycomb-shaped substrates which can be used as a substrate for a catalyst for purification of exhaust gas, among which a honeycomb-shaped monolithic substrate (honeycomb filter, high-density honeycomb, or the like) is preferable. In addition, a material of the substrate is not particularly limited, either, and it is possible to mention substrates made of a ceramic such as cordierite, silicon carbide, silica, alumina, or mullite, or a substrate made of a metal such as stainless steel containing chromium and aluminum, among which cordierite is preferable from the viewpoint of cost.

(Catalyst Coat Layer)

The catalyst coat layer in the catalyst for purification of exhaust gas of the present invention is formed on a surface of the substrate, and contains catalyst particles. The catalyst coat layer is preferably one consisting essentially of the catalyst particles. The catalyst particles forming the catalyst coat layer are not particularly limited, as long as the catalyst particles have an exhaust gas purification performance. For example, it is possible to mention catalyst particles in which a noble metal is supported on catalyst substrate particles (oxide particles (preferably, porous oxide particles)) made of an oxide such as aluminum oxide ($Al_2O_3$, alumina), cerium oxide ($CeO_2$, ceria), zirconium oxide ($ZrO_2$, zirconia), silicon oxide ($SiO_2$, silica), yttrium oxide ($Y_2O_3$, yttria), or neodymium oxide ($Nd_2O_3$), a composite oxide thereof, or the like. These catalyst particles may be used alone or in combination of two or more kinds.

Note that the "one consisting essentially of the catalyst particles" in the catalyst coat layer means that the catalyst coat layer consists (only) of the catalyst particles, or consists mainly of the catalyst particles and contains other components to the extent that the effects of the invention are not impaired. As the other components, it is possible to mention other metal oxides, additives, and the like used for a catalyst coat layer of this type of intended purpose, and examples thereof include alkali metals such as potassium (K), sodium (Na), lithium (Li), and cesium (Cs), alkaline earth metals such as barium (Ba), calcium (Ca), and strontium (Sr), rare-earth elements such as lanthanum (La), yttrium (Y), and cerium (Ce), transition metals such as iron (Fe), and the like. These components may be used alone or in combination of two or more kinds.

The above noble metals are not particularly limited, and examples thereof include platinum (Pt), palladium (Pd), rhodium (Rh), gold (Au), silver (Ag), iridium (Ir), and ruthenium (Ru). These noble metals may be used alone or in combination of two or more kinds. In addition, among these noble metals, from the viewpoint of catalytic performance, Pt, Rh, Pd, Ir, and Ru are preferable, and Pt, Rh, and Pd are particularly preferable. In the catalyst for purification of exhaust gas of the present invention, since such a noble metal is supported in the entire catalyst coat layer, a relatively high catalytic performance is exhibited. On the other hand, a catalyst for purification of exhaust gas in which the noble metal is supported on some of the catalyst substrate particles in the catalyst coat layer does not exhibit sufficient catalytic performance.

In the catalyst for purification of exhaust gas of the present invention, the coating amount of the catalyst coat layer (the coating amount of the catalyst substrate particles) is preferably in the range of 50 to 300 g/L, more preferably in the range of 50 to 250 g/L, and particularly preferably in the range of 50 to 200 g/L, per unit volume of the substrate. If the coating amount of the catalyst coat layer is less than the lower limit, the catalytic activity of the catalyst particles is not sufficiently obtained, and thus a sufficient catalytic performance tends not to be exhibited. Meanwhile, if the coating amount of the catalyst coat layer exceeds the upper limit, the catalyst coat layer becomes thicker, which tends to increase pressure drop and worsen fuel efficiency.

In addition, in the catalyst for purification of exhaust gas of the present invention, the coating amount of the noble metal is preferably in the range of 0.05 to 10 g/L, more preferably in the range of 0.1 to 10 g/L, and particularly preferably in the range of 0.1 to 5 g/L, per unit volume of the substrate. If the coating amount of the noble metal is less than the lower limit, the catalytic activity is not sufficiently obtained, and thus a sufficient catalytic performance tends not to be exhibited. Meanwhile, if the coating amount of the noble metal exceeds the upper limit, the catalytic activity is saturated, which tends to increase the cost.

The catalyst coat layer in the catalyst for purification of exhaust gas of the present invention has to have an average thickness in the range of 25 to 150 μm. If the average thickness of the catalyst coat layer is less than the lower limit, the catalytic activity of the catalyst particles is not sufficiently obtained, and thus a sufficient catalytic performance cannot be exhibited. Meanwhile, if the average thickness of the catalyst coat layer exceeds the upper limit, the pressure drop when exhaust gas or the like passes through the catalyst coat layer becomes large, and thus a sufficient catalytic performance cannot be exhibited. In addition, from the viewpoint of balancing pressure drop, catalytic performance, and durability, the average thickness of the catalyst coat layer is preferably in the range of 50 to 100 μm, and particularly preferably in the range of 70 to 90 μm. Note that the average thickness of the catalyst coat layer can be determined by observing a cross-section of the catalyst coat layer in the radial direction of the substrate by scanning electron microscopy, optical microscopy, or the like, measuring the thickness of the catalyst coat layer at 10 randomly selected locations in the obtained micrographs, and then averaging these measurements.

In addition, the catalyst coat layer in the catalyst for purification of exhaust gas of the present invention has to have a void fraction in the range of 1.5 to 8.0% by volume. If the void fraction of the catalyst coat layer is less than the lower limit, the diffusivity of gas into the interior of the catalyst coat layer is reduced, and thus a sufficient catalytic performance cannot be exhibited. Meanwhile, if the void fraction of the catalyst coat layer exceeds the upper limit, the coating amount of the catalyst particles becomes small, and thus the catalytic activity is not sufficiently obtained, so that a sufficient catalytic performance cannot be exhibited. In addition, from the viewpoint of balancing gas diffusivity and catalytic activity, the void fraction of the catalyst coat layer is preferably in the range of 1.6 to 7.0% by volume, and particularly preferably in the range of 3.0 to 7.0% by volume. Note that the void fraction of the catalyst coat layer can be determined as follows. A cross-section of the catalyst coat layer in the flow direction of exhaust gas in the substrate is observed with a scanning electron microscope, and the SEM image obtained is subjected to a binarization process using commercially available image analysis software (for example, two-dimensional image analysis software "WinROOF" manufactured by Mitani Corporation) by using the difference in brightness between the pores and the catalytic components. The pores are extracted, and the ratio of the area occupied by the pore portions in relation to the captured field of view is calculated for three or more captured fields of view, and averaged. In addition, the shape of the voids is not particularly limited, and it may be, for example, spherical, elliptical, cylindrical, rectangular (prismatic), disk-shaped, through channel-shaped, similar shapes, and the like. Furthermore, such voids include micropores with a cross-sectional equivalent circle diameter of less than 2 μm, high-aspect ratio pores with a cross-sectional equivalent circle diameter of 2 μm or more and an aspect ratios of 5 or higher, and pores with a cross-sectional equivalent circle diameter of 2 μm or more and an aspect ratio of less than 5.

Furthermore, in the catalyst coat layer of the catalyst for purification of exhaust gas of the present invention, 60 to 90% by volume of all voids in the catalyst coat layer have to be high-aspect ratio pores which have equivalent circle diameters in a range of 2 to 50 μm in a cross-sectional image of a cross-section of the catalyst coat layer perpendicular to a flow direction of exhaust gas in the substrate, and which have aspect ratios of 5 or higher. If the ratio of the high-aspect ratio pores to all the voids is less than the lower limit, the diffusivity of gas into the interior of the catalyst coat layer is reduced, and thus a sufficient catalytic performance cannot be exhibited. Meanwhile, if the ratio of the high-aspect ratio pores to all the voids exceeds the upper limit, the ratio of gas that passes through the catalyst coat layer without contacting the catalytically active sites increases, and thus a sufficient catalytic performance cannot be exhibited. In addition, the ratio of the high-aspect ratio pores to all the voids is preferably in the range of 70 to 90% by volume, and particularly preferably in the range of 75 to 89% by volume, from the viewpoint of balancing gas diffusivity and contact efficiency to the catalytically active sites. Note that the ratio of the high-aspect ratio pores to all the voids can be determined by measuring the void fraction due to the high-aspect ratio pores in the catalyst coat layer in accordance with the method described in WO 2016/136560 A and dividing the void fraction due to the high-aspect ratio pores by the void fraction of the catalyst coat layer (void fraction due to the high-aspect ratio pores/void fraction of the catalyst coat layer).

In addition, in the catalyst coat layer in the catalyst for purification of exhaust gas of the present invention, the high-aspect ratio pores have to have an average aspect ratio in the range of 10 to 50. If the average aspect ratio of the high-aspect ratio pores is less than the lower limit, the pore connectivity is not sufficiently obtained. Meanwhile, if the average aspect ratio of the high-aspect ratio pores exceeds the upper limit, ratio of gas that passes through the catalyst coat layer without contacting the catalytically active sites increases, and thus a sufficient catalytic performance cannot be exhibited. In addition, the average aspect ratio of the high-aspect ratio pores is preferably in the range of 10 to 35, and particularly preferably in the range of 10 to 30, from the viewpoint of balancing gas diffusivity and contact efficiency to the catalytically active sites. Note that the average aspect ratio of the high-aspect ratio pores can be determined in accordance with the method described in WO 2016/136560 A.

[Catalyst for Purification of Exhaust Gas]

The catalyst for purification of exhaust gas of the present invention comprises: the above-described substrate, and the above-described catalyst coat layer which is formed on a surface of the substrate and which contains the catalyst particles. Note that the catalyst for purification of exhaust gas of the present invention may be used in combination with another catalyst. The other catalyst is not particularly limited, and it is possible to mention known catalysts (for example, in the case of a catalyst for purification of automotive exhaust gas, an oxidation catalyst, a NOx reduction catalyst, a NOx storage reduction-type catalyst (NSR catalyst), a lean NOx trap catalyst (LNT catalyst), a NOx selective reduction catalyst (SCR catalyst), or the like). These other catalysts may be used alone or in combination of two or more kinds.

(Method for Producing Catalyst for Purification of Exhaust Gas)

The catalyst for purification of exhaust gas of the present invention can be produced, for example, by the following method. That is, first, the catalyst substrate particles having an average particle diameter of 0.5 to 4 μm (hereinafter referred to as the "catalyst substrate particles A"), the catalyst substrate particles having an average particle diameter of 4 to 15 μm (hereinafter referred to as the "catalyst substrate particles B"), a noble metal raw material, and a pore-forming material are mixed to prepare a catalyst slurry. This catalyst slurry is applied to the surface of the substrate to form a catalyst slurry layer, and this catalyst slurry layer is calcined to remove the pore-forming material. As a result, it is possible to obtain the catalyst for purification of exhaust gas of the present invention, in which the catalyst coat layer is formed on the substrate.

(Preparation of Catalyst Slurry)

The method for producing the catalyst for purification of exhaust gas involves the use of the catalyst substrate particles A having an average particle diameter of 0.5 to 4 μm and the catalyst substrate particles B having an average particle diameter of 4 to 15 μm. This makes it possible to form a dense catalyst coat layer with the void fraction in the aforementioned range. On one hand, in the case of using only the catalyst substrate particles A, the catalyst coat layer tends to shrink, and thus exfoliation of the catalyst coat layer tends to occur. On the other hand, in the case of using only the catalyst substrate particles B, the catalyst coat layer becomes thicker, so that the pressure drop when exhaust gas or the like passes through the catalyst coat layer becomes large, and a sufficient catalytic performance tends not to be exhibited. In addition, as for the average particle diameters of the aforementioned catalyst substrate particles A and B, from the viewpoint that a thinner, more dense catalyst coat layer can be formed, the average particle diameter of the catalyst substrate particles A is preferably in the range of 1.0 to 3.0 μm, and the average particle diameter of the catalyst substrate particles B is preferably in the range of 4.0 to 7.0 μm.

As the mixing ratio of the catalyst substrate particles A to the catalyst substrate particles B, the mass ratio (A/B) is preferably in the range of 1/10 to 10/1, more preferably in the range of 1/5 to 5/1, and particularly preferably in the range of 1/3 to 3/1. If the mass ratio (A/B) is less than the lower limit, the catalyst coat layer becomes thicker, so that the pressure drop when exhaust gas or the like passes through the catalyst coat layer becomes large, and thus a sufficient catalytic performance tends not to be exhibited. Meanwhile, if the mass ratio (A/B) exceeds the upper limit, exfoliation of the catalyst coat layer tends to occur.

The noble metal raw material used in the method for producing the catalyst for purification of exhaust gas is not particularly limited, and examples thereof include a solution in which a salt (for example, acetic acid salt, carbonic acid salt, nitric acid salt, ammonium salt, citric acid salt, dinitro diammine salt, or the like) of a noble metal (for example, Pt, Rh, Pd, Ru, or the like, or a compound thereof), or a complex thereof (for example, a tetraammine complex) is dissolved in a solvent such as water, an alcohol, or the like. The content of the noble metal raw material in the catalyst slurry is not particularly limited and can be set appropriately according to the amount of noble metal supported in the catalyst coat layer, and it is preferably in the range of 0.1 to 10 parts by mass, more preferably in the range of 0.1 to 5 parts by mass, and particularly preferably in the range of 0.1 to 3 parts by mass in terms of metal relative to 100 parts by mass of the total amount of the catalyst substrate particles A and the catalyst substrate particles B.

The pore-forming material used in the method for producing the catalyst for purification of exhaust gas is not particularly limited as long as the material can be removed by the calcination process described later, and examples thereof include fibrous organic materials such as polyethylene terephthalate (PET) fibers, acrylic fibers, nylon fibers, rayon fibers, and cellulose fibers. These fibrous organic materials may be used alone or in combination of two or more kinds. Among these fibrous organic materials, PET fibers and nylon fibers are preferable from the viewpoint of balancing processability and calcination temperature. Containing the pore-forming material in the catalyst slurry and removing the pore-forming material by the subsequent calcination process make it possible to form voids having shapes which are the same as the shape of the pore-forming material in the catalyst coat layer. The voids thus formed serve as diffusion flow paths for exhaust gas, so that a relatively high catalytic performance can be exhibited even in a dense catalyst coat layer.

The pore-forming material has an average diameter preferably in the range of 1.7 to 8.0 μm, more preferably in the range of 2.0 to 6.0 μm, and particularly preferably in the range of 2.0 to 5.0 μm. If the average diameter of the pore-forming material is less than the lower limit, the cross-sectional equivalent circle diameter of the high-aspect ratio pores becomes small and the diffusivity of gas into the interior of the catalyst coat layer is reduced, and thus a sufficient catalytic performance tends not to be exhibited. Meanwhile, if the average diameter of the pore-forming material exceeds the upper limit, the cross-sectional equivalent circle diameter of the high-aspect ratio pores becomes large, so that the ratio of gas that passes through the catalyst coat layer without contacting the catalytically active sites increases, and thus a sufficient catalytic performance tends not to be exhibited.

In addition, the pore-forming material has an average length preferably in the range of 15 to 150 μm, more preferably in the range of 15 to 120 μm, and particularly preferably in the range of 20 to 120 μm. If the average length of the pore-forming material is less than the lower limit, the average aspect ratio of the high-aspect ratio pores becomes small, and thus the pore connectivity tends not to be sufficiently obtained. Meanwhile, if the average length of the pore-forming material exceeds the upper limit, the average aspect ratio of the high-aspect ratio pores becomes large, so that ratio of gas that passes through the catalyst coat layer without contacting the catalytically active sites increases, and thus a sufficient catalytic performance tends not to be exhibited.

Furthermore, the pore-forming material has an average aspect ratio preferably in the range of 9 to 50, more preferably in the range of 9 to 35, and particularly preferably in the range of 9 to 30. If the average aspect ratio of the pore-forming material is less than the lower limit, the average aspect ratio of the high-aspect ratio pores becomes small, and thus the pore connectivity tends not to be sufficiently obtained. Meanwhile, if the average aspect ratio of the pore-forming material exceeds the upper limit, the average aspect ratio of the high-aspect ratio pores becomes large, so that ratio of gas that passes through the catalyst coat layer without contacting the catalytically active sites increases, and thus a sufficient catalytic performance tends not to be exhibited. Note that the average aspect of the pore-forming material is defined as "average length/average diameter." Here, the "length of the pore-forming material" is defined as the straight distance between the start point and end point of the pore-forming material. The average length can be determined by measuring and averaging the lengths of 50 or more randomly selected pore-forming materials. In addition, the average diameter can be determined by measuring and averaging the diameters of 50 or more randomly selected pore-forming materials.

The content of the pore-forming material in the catalyst slurry is preferably in the range of 0.5 to 4.5 parts by mass, more preferably in the range of 0.6 to 4.0 parts by mass, and particularly preferably in the range of 1.5 to 3.5 parts by mass relative to 100 parts by mass of the total amount of the catalyst substrate particles A and the catalyst substrate particles B. If the content of the pore-forming material is less than the lower limit, the ratio of the high-aspect ratio pores to all the voids becomes small, and the diffusivity of gas into the interior of the catalyst coat layer is reduced, and thus a sufficient catalytic performance tends not to be exhibited. Meanwhile, if the content of the pore-forming material exceeds the upper limit, the ratio of gas that passes through the catalyst coat layer without contacting the catalytically active sites increases, and thus a sufficient catalytic performance tends not to be exhibited.

The method for preparing the catalyst slurry is not particularly limited, and for example, it is sufficient to mix the catalyst substrate particles A, the catalyst substrate particles B, the noble metal raw material, and the pore-forming material, and a known mixing method can be employed as appropriate. The mixing conditions are not particularly limited as long as the aforementioned pore-forming material can be uniformly dispersed and mixed in the catalyst slurry, and for example, it is preferable that the stirring speed is in the range of 100 to 400 rpm and the processing time is 30 minutes or more.

As for the mixing order of each component, at least the noble metal raw material needs to be mixed with both the catalyst substrate particles A and the catalyst substrate particles B. This enables the formation of a catalyst coat layer in which the noble metal is supported on the entire layer, which makes it possible to exhibit a relatively high catalytic performance. Specifically, the methods are as follows: a method in which the noble metal raw material is mixed with a dispersion liquid containing the catalyst substrate particles A and the catalyst substrate particles B to support the noble metal thereon, and then the pore-forming material is mixed; a method in which the pore-forming material is mixed with a dispersion liquid containing the catalyst substrate particles A and the catalyst substrate particles B, and then the noble metal raw material is mixed; a method in which the noble metal raw material and the pore-forming material are simultaneously mixed with a dispersion liquid containing the catalyst substrate particles A and the catalyst substrate particles B; a method in which the catalyst substrate particles A, the catalyst substrate particles B and the pore-forming material are mixed with a solution containing the noble metal raw material; and the like. On the other hand, if the noble metal raw material is mixed with one of the catalyst substrate particles A and the catalyst substrate particles B and supported, a sufficient catalytic performance cannot be exhibited.

(Formation of Catalyst Slurry Layer)

Next, the catalyst slurry thus prepared is applied to the surface of the substrate to form a catalyst slurry layer. The coating method is not particularly limited, and it is possible to mention known methods such as a method in which the substrate is immersed in the catalyst slurry and is coated with the catalyst slurry (immersion method), a wash-coating method, a method in which the catalyst slurry is intruded by intruding means, and the like.

In the coating method for the catalyst slurry, the total coating amount of the catalyst substrate particles A and the catalyst substrate particles B is preferably in the range of 50 to 300 g/L, more preferably in the range of 50 to 250 g/L, and particularly preferably in the range of 50 to 200 g/L per unit volume of the substrate. If the coating amount of the catalyst slurry is less than the lower limit, the catalytic activity of the catalyst particles is not sufficiently obtained, and thus a sufficient catalytic performance tends not to be exhibited. Meanwhile, if the coating amount of the catalyst slurry exceeds the upper limit, the catalyst coat layer tends to become thicker, which tends to increase pressure drop and worsen fuel efficiency.

The coating amount of the noble metal raw material is preferably in the range of 0.05 to 10 g/L, more preferably in the range of 0.1 to 10 g/L, and particularly preferably in the range of 0.1 to 5 g/L in terms of metal per unit volume of the substrate. If the coating amount of the noble metal raw material is less than the lower limit, the catalytic activity is not sufficiently obtained, and thus a sufficient catalytic performance tends not to be exhibited. Meanwhile, if the coating amount of the noble metal raw material exceeds the upper limit, the catalytic activity is saturated, which tends to increase the cost.

Furthermore, the coating amount of the pore-forming material is preferably in the range of 0.25 to 13.5 g/L, more preferably in the range of 0.3 to 10 g/L, and particularly preferably in the range of 0.75 to 7 g/L per unit volume of the substrate. If the coating amount of the pore-forming material is less than the lower limit, the ratio of the high-aspect ratio pores to all the voids becomes small, and the diffusivity of gas into the interior of the catalyst coat layer is reduced, and thus a sufficient catalytic performance tends not to be exhibited. Meanwhile, if the coating amount of the pore-forming material exceeds the upper limit, the ratio of the high-aspect ratio pores to all the voids increases, so that ratio of gas that passes through the catalyst coat layer without contacting the catalytically active sites increases, and thus a sufficient catalytic performance tends not to be exhibited.

(Calcination Process)

Next, the catalyst slurry layer thus formed is subjected to a calcination process to remove the pore-forming material, and thus the catalyst for purification of exhaust gas of the present invention is obtained in which the catalyst coat layer containing the high-aspect ratio pores in a predetermined ratio is formed on the substrate. The calcination temperature is preferably 300 to 800° C., and more preferably 400 to 700° C. If the calcination temperature is less than the lower limit, the pore-forming material tends to remain. Meanwhile, if the calcination temperature exceeds the upper limit, the noble metal tends to sinter. In addition, the calcination time cannot be generally specified because it varies depending on the calcination temperature; however, the calcination time is preferably 20 minutes or more, and more preferably 30 minutes to 2 hours. Moreover, an atmosphere in the calcination process is not particularly limited, and it is preferably performed in air or in an inert gas such as nitrogen ($N_2$).

EXAMPLES

Hereinafter, the present invention is described more specifically on the basis of Examples and Comparative Examples; however, the present invention is not limited to Examples below.

Example 1

First, to 500 ml of ion-exchanged water, 50 g of yttria-containing zirconia particles (which were prepared by pulverizing a yttria-containing zirconia powder ($ZrO_2$ content: 80% by mass, $Y_2O_3$ content: 20% by mass) in advance so that the average particle diameter was 2.5 μm), 50 g of ceria-zirconia solid solution particles (which were prepared by pulverizing a ceria-zirconia solid solution powder ($CeO_2$ content: 20% by mass, $ZrO_2$ content: 80% by mass) in advance so that the average particle diameter was 2.0 μm), 50 g of lanthana-containing alumina particles (which were prepared by pulverizing a lanthana-containing alumina powder ($Al_2O_3$ content: 96% by mass, $La_2O_3$ content: 4% by mass) in advance so that the average particle diameter was 6.0 μm), and 10 ml of a rhodium nitrate solution containing, as a noble metal raw material, 0.45 g of rhodium (Rh) in terms of metal were added, and zirconia balls (average diameter: 3 mm) were further added, which were subjected to stirring treatment using an Attritor Mill (manufactured by Mitsui Mining Company, Limited) under the conditions of a stirring speed of 300 rpm and a treatment time of 30 minutes to obtain a dispersion liquid containing the yttria-containing zirconia particles, the ceria-zirconia solid solution particles, and the lanthana-containing alumina particles in a mass ratio of 1:1:1.

Next, to this dispersion liquid, 1.5 g of polyethylene terephthalate fibers (PET fibers, average diameter: 4 μm, average length 60 μm, average aspect ratio: 15) was added as a pore-forming material, which was subjected to a stirring treatment using a propeller stirrer (manufactured by AS ONE Corporation) under the conditions of a stirring speed of 200 rpm and a treatment time of 60 minutes to obtain a catalyst slurry containing 0.3 parts by mass of rhodium and 1.0 part by mass of the PET fibers relative to 100 parts by mass of the total amount of the yttria-containing zirconia particles, the ceria-zirconia solid solution particles, and the lanthana-containing alumina particles.

Next, the catalyst slurry was wash-coated (coated) onto a cordierite monolithic honeycomb substrate (manufactured by NGK Insulators, Ltd., diameter: 30 mm, length: 50 mm, volume: 35 ml, cell shape: rectangle, cell density: 400 cell/inch$^2$, wall thickness: 4 mil) and dried at 120° C. for 2 hours in air. The coating and drying were repeated to form a catalyst slurry layer on the honeycomb substrate, which contained 50 g/L of the yttria-containing zirconia particles, 50 g/L of the ceria-zirconia solid solution particles, 50 g/L of the lanthana-containing alumina particles catalyst, 0.45 g/L of rhodium, and 1.5 g/L of the PET fibers per liter of the honeycomb substrate.

The catalyst slurry layer was then calcined at 500° C. for 2 hours in air to remove the aforementioned PET fibers, to thereby obtain a catalyst for purification of exhaust gas in which a catalyst coat layer was formed on the inner wall surfaces of the cells of the honeycomb substrate, which contained 50 g/L of the yttria-containing zirconia particles, 50 g/L of the ceria-zirconia solid solution particles, 50 g/L of the lanthana-containing alumina particles catalyst, and 0.45 g/L of rhodium supported on the entire layer per liter of the honeycomb substrate.

Example 2

In the same manner as in Example 1 except that the amount of the PET fibers added was changed to 3.75 g, a catalyst slurry was prepared, which contained 0.3 parts by mass of rhodium and 2.5 part by mass of the PET fibers relative to 100 parts by mass of the total amount of the yttria-containing zirconia particles, the ceria-zirconia solid solution particles, and the lanthana-containing alumina particles, and in the same manner as in Example 1 except that this catalyst slurry was used, a catalyst slurry layer was formed on the honeycomb substrate, which contained 50 g/L of the yttria-containing zirconia particles, 50 g/L of the ceria-zirconia solid solution particles, 50 g/L of the lanthana-containing alumina particles catalyst, 0.45 g/L of rhodium, and 3.75 g/L of the PET fibers per liter of the honeycomb substrate, and further, a catalyst for purification of exhaust gas was obtained in which a catalyst coat layer was formed on the inner wall surfaces of the cells of the honeycomb substrate, which contained 50 g/L of the yttria-containing zirconia particles, 50 g/L of the ceria-zirconia solid solution particles, 50 g/L of the lanthana-containing alumina particles catalyst, and 0.45 g/L of rhodium supported on the entire layer per liter of the honeycomb substrate.

Comparative Example 1

In the same manner as in Example 1 except that the PET fibers were not added, a catalyst slurry was prepared, which contained 0.3 parts by mass of rhodium relative to 100 parts by mass of the total amount of the yttria-containing zirconia particles, the ceria-zirconia solid solution particles, and the lanthana-containing alumina particles, and in the same manner as in Example 1 except that this catalyst slurry was used, a catalyst slurry layer was formed on the honeycomb substrate, which contained 50 g/L of the yttria-containing zirconia particles, 50 g/L of the ceria-zirconia solid solution particles, 50 g/L of the lanthana-containing alumina particles catalyst, and 0.45 g/L of rhodium per liter of the honeycomb substrate, and further, a catalyst for purification of exhaust gas was obtained in which a catalyst coat layer was formed on the inner wall surfaces of the cells of the honeycomb substrate, which contained 50 g/L of the yttria-containing zirconia particles, 50 g/L of the ceria-zirconia solid solution particles, 50 g/L of the lanthana-containing alumina particles catalyst, and 0.45 g/L of rhodium supported on the entire layer per liter of the honeycomb substrate.

Comparative Example 2

In the same manner as in Example 1 except that the amount of the PET fibers added was changed to 7.5 g, a catalyst slurry was prepared, which contained 0.3 parts by mass of rhodium and 5.0 part by mass of the PET fibers relative to 100 parts by mass of the total amount of the yttria-containing zirconia particles, the ceria-zirconia solid solution particles, and the lanthana-containing alumina particles, and in the same manner as in Example 1 except that this catalyst slurry was used, a catalyst slurry layer was formed on the honeycomb substrate, which contained 50 g/L of the yttria-containing zirconia particles, 50 g/L of the ceria-zirconia solid solution particles, 50 g/L of the lanthana-containing alumina particles catalyst, 0.45 g/L of rhodium, and 7.5 g/L of the PET fibers per liter of the honeycomb substrate, and further, a catalyst for purification of exhaust gas was obtained in which a catalyst coat layer was formed on the inner wall surfaces of the cells of the honeycomb substrate, which contained 50 g/L of the yttria-containing zirconia particles, 50 g/L of the ceria-zirconia solid solution particles, 50 g/L of the lanthana-containing alumina particles catalyst, and 0.45 g/L of rhodium supported on the entire layer per liter of the honeycomb substrate.

Comparative Example 3

First, 100 g of yttria-containing zirconia particles (which were prepared by pulverizing a yttria-containing zirconia powder ($ZrO_2$ content: 80% by mass, $Y_2O_3$ content: 20% by mass) in advance so that the average particle diameter was 2.5 μm) was impregnated with 20 ml of rhodium nitrate solution containing, as a noble metal raw material, 0.9 g of rhodium (Rh) in terms of metal, which were dried at 110° C. for 12 hours in air, and further calcined at 500° C. for 3 hours in air to obtain a rhodium-supported yttria-containing zirconia particles (amount of rhodium supported on 100 parts by mass of yttria-containing zirconia particles: 0.9 parts by mass).

Next, to 500 ml of ion-exchanged water, 50 g of the above-described rhodium-supported yttria-containing zirconia particles, 50 g of ceria-zirconia solid solution particles (which were prepared by pulverizing a ceria-zirconia solid solution powder ($CeO_2$ content: 20% by mass, $ZrO_2$ content: 80% by mass) in advance so that the average particle diameter was 2.0 μm), and 50 g of lanthana-containing alumina particles (which were prepared by pulverizing a lanthana-containing alumina powder ($Al_2O_3$ content: 96% by mass, $La_2O_3$ content: 4% by mass) in advance so that the average particle diameter was 6.0 μm) were added, and zirconia balls (average diameter: 3 mm) were further added, which were subjected to stirring treatment using an Attritor Mill (manufactured by Mitsui Mining Company, Limited) under the conditions of a stirring speed of 300 rpm and a treatment time of 30 minutes to obtain a dispersion liquid containing the above-described rhodium-supported yttria-containing zirconia particles, the ceria-zirconia solid solution particles, and the lanthana-containing alumina particles in a mass ratio of 1:1:1.

Next, to this dispersion liquid, 3.75 g of polyethylene terephthalate fibers (PET fibers, average diameter: 4 μm, average length 60 μm, average aspect ratio: 15) was added as a pore-forming material, which was subjected to a stirring treatment using a propeller stirrer (manufactured by AS ONE Corporation) under the conditions of a stirring speed of 200 rpm and a treatment time of 60 minutes to obtain a catalyst slurry containing 2.5 parts by mass of the PET fibers relative to 100 parts by mass of the total amount of the rhodium-supported yttria-containing zirconia particles, the ceria-zirconia solid solution particles, and the lanthana-containing alumina particles.

Next, in the same manner as in Example 1 except that this catalyst slurry was used, a catalyst slurry layer was formed on the honeycomb substrate, which contained 50 g/L of the rhodium-supported yttria-containing zirconia particles, 50 g/L of the ceria-zirconia solid solution particles, 50 g/L of the lanthana-containing alumina particles catalyst, and 3.75 g/L of the PET fibers per liter of the honeycomb substrate, and further, a catalyst for purification of exhaust gas was obtained in which a catalyst coat layer was formed on the inner wall surfaces of the cells of the honeycomb substrate, which contained 50 g/L of the rhodium-supported yttria-containing zirconia particles, 50 g/L of the ceria-zirconia solid solution particles, and 50 g/L of the lanthana-containing alumina particles catalyst per liter of the honeycomb substrate. Note that the amount of rhodium supported in the catalyst slurry layer and the catalyst coat layer is 0.45 g/L per liter of the honeycomb substrate.

Comparative Example 4

In the same manner as in Example 2 except that yttria-containing zirconia particles which were prepared by pulverizing a yttria-containing zirconia powder ($ZrO_2$ content: 80% by mass, $Y_2O_3$ content: 20% by mass) in advance so that the average particle diameter was 5.0 μm were used instead of the yttria-containing zirconia particles having an average particle diameter of 2.5 μm and ceria-zirconia solid solution particles which were prepared by pulverizing a ceria-zirconia solid solution powder ($CeO_2$ content: 20% by mass, $ZrO_2$ content: 80% by mass) in advance so that the average particle diameter was 5.5 μm instead of the ceria-zirconia solid solution particles having an average particle diameter of 2.0 μm, a catalyst slurry was prepared, which contained 0.3 parts by mass of rhodium and 2.5 part by mass of the PET fibers relative to 100 parts by mass of the total amount of the yttria-containing zirconia particles, the ceria-zirconia solid solution particles, and the lanthana-containing alumina particles, and in the same manner as in Example 2 except that this catalyst slurry was used, a catalyst slurry layer was formed on the honeycomb substrate, which contained 50 g/L of the yttria-containing zirconia particles, 50 g/L of the ceria-zirconia solid solution particles, 50 g/L of the lanthana-containing alumina particles catalyst, 0.45 g/L of rhodium, and 3.75 g/L of the PET fibers per liter of the honeycomb substrate, and further, a catalyst for purification of exhaust gas was obtained in which a catalyst coat layer was formed on the inner wall surfaces of the cells of the honeycomb substrate, which contained 50 g/L of the yttria-containing zirconia particles, 50 g/L of the ceria-zirconia solid solution particles, 50 g/L of the lanthana-containing alumina particles catalyst, and 0.45 g/L of rhodium supported on the entire layer per liter of the honeycomb substrate.

<Average Thickness of Catalyst Coat Layer>

The obtained catalyst for purification of exhaust gas, which was embedded in epoxy resin, was cut in the radial direction of the honeycomb substrate, and the resulting cross section was polished and observed (measurement magnification: 1300 times) with a scanning electron microscope ("S-4800" manufactured by Hitachi High-Tech Corporation). In the SEM image obtained, the thickness of the catalyst coat layer was measured at 10 randomly selected locations, and these were averaged to determine the average thickness of the catalyst coat layer. The results are shown in Table 1.

<Void Fraction of Catalyst Coat Layer>

The obtained catalyst for purification of exhaust gas was cut in the flow direction of exhaust gas in the honeycomb substrate, and the resulting cross section was polished and observed (output: 15 kV, measurement magnification: 3000 times) with a scanning electron microscope ("S-4800" manufactured by Hitachi High-Tech Corporation). The SEM image obtained was subjected to a binarization process using commercially available image analysis software (two-dimensional image analysis software "WinROOF" manufactured by Mitani Corporation) by using the difference in brightness between the pores and the catalytic components to extract the pores and calculate the ratio of the area occupied by the pore portions in the captured field of view (30 μm in length and 40 μm in width). The ratio of the area occupied by the pore portions was calculated for three or more fields of view, and the average value thereof was used as the void fraction of the catalyst coat layer. The results are shown in Table 1.

<Average Aspect Ratio of High-Aspect Ratio Pores>

The equivalent circle diameter and aspect ratio of each pore in the catalyst coat layer of the obtained catalyst for purification of exhaust gas were measured in accordance with the method described in WO 2016/136560 A to determine the average aspect ratio of the pores whose equivalent circle diameter was in the range of 2 to 50 μm and whose aspect ratio was 5 or higher (high-aspect ratio pores). The results are shown in Table 1.

<Void Fraction Due to High-Aspect Ratio Pores>

The void fraction due to high-aspect ratio pores in the catalyst coat layer of the obtained catalyst for purification of exhaust gas was measured in accordance with the method described in WO 2016/136560 A. The results are shown in Table 1.

<Ratio of High-Aspect Ratio Pores to All Voids>

The void fraction due to the high-aspect ratio pores was divided by the void fraction of the catalyst coat layer to determine the ratio of the high-aspect ratio pores to all the voids (=void fraction of the high-aspect ratio pores/void fraction of the catalyst coat layer). The results are shown in Table 1.

<NOx Removal Ratio>

First, an endurance test was conducted by alternately flowing a stoichiometric model gas [NO (3000 ppm)+$C_3H_6$ (1000 ppm C)+$N_2$ (balance)] (3 minutes) and a lean model gas [NO (3000 ppm)+C$_3$H$_6$ (500 ppm C)+N$_2$ (balance)] (1 minute) into the obtained catalyst for purification of exhaust gas in the conditions of a temperature of 900° C. and a gas flow rate of 20 L/min for 50 hours.

Rich model gas with an air-fuel ratio of A/F=13.3 [NO (3000 ppm)+C$_3$H$_6$ (3300 ppm C)+N$_2$ (balance)] was flowed into the catalyst for purification of exhaust gas after the endurance test in the conditions of a temperature of 550° C. and a space time of SV=170000/sec. The NO concentrations in the catalyst inlet gas and the catalyst outlet gas were measured to calculate the NOx removal ratio. The results are shown in Table 1.

without contacting the catalytically active sites increased, and thus a sufficient catalytic performance was not exhibited.

Moreover, it was found that the catalyst for purification of exhaust gas having a catalyst coat layer in which the noble metal was not supported on the entire layer (Comparative Example 3) had a lower NOx removal ratio than that of the catalysts for purification of exhaust gas in which the noble metal was supported on the entire layer (Examples 1 and 2). The present inventors infer that this is because in the catalyst for purification of exhaust gas of Comparative Example 3, even though the gas diffused sufficiently into the catalyst

TABLE 1

|  |  |  | Example 1 | Example 2 | Comp. Ex. 1 | Comp. Ex. 2 | Comp. Ex. 3 | Comp. Ex. 4 |
|---|---|---|---|---|---|---|---|---|
| Metal Oxide Particles | Average Particle Diameter [μm] | Particles 1*[1] | 2.5 | 2.5 | 2.5 | 2.5 | 2.5 | 5.0 |
|  |  | Particles 2*[1] | 2.0 | 2.0 | 2.0 | 2.0 | 2.0 | 5.5 |
|  |  | Particles 3*[1] | 6.0 | 6.0 | 6.0 | 6.0 | 6.0 | 6.0 |
| Pore-Forming Material | Average Diameter [μm] |  | 4 | 4 | — | 4 | 4 | 4 |
|  | Average Length [μm] |  | 60 | 60 | — | 60 | 60 | 60 |
|  | Average Aspect Ratio |  | 15 | 15 | — | 15 | 15 | 15 |
|  | Amount Added*[2] [Parts by Mass] |  | 1.0 | 2.5 | 0 | 5.0 | 2.5 | 2.5 |
| Catalyst Coat Layer | Coating Amount [g/L] | Particles 1*[1] | 50 | 50 | 50 | 50 | 50 | 50 |
|  |  | Particles 2*[1] | 50 | 50 | 50 | 50 | 50 | 50 |
|  |  | Particles 3*[1] | 50 | 50 | 50 | 50 | 50 | 50 |
|  |  | Noble Metal | 0.45 | 0.45 | 0.45 | 0.45 | 0.45 | 0.45 |
|  | Noble Metal Support Position |  | Entire Layer | Entire Layer | Entire Layer | Entire Layer | Particles 1*[1] | Entire Layer |
|  | Average Thickness [μm] |  | 75 | 85 | 70 | 110 | 85 | 170 |
|  | Void Fraction [vol %] |  | 1.9 | 5.2 | 0.5 | 8.5 | 5.1 | 13.8 |
|  | High-Aspect Ratio Pore | Average Aspect Ratio | 15.7 | 16.1 | — | 16.3 | 15.1 | 12.6 |
|  |  | Void Fraction [vol %] | 1.4 | 4.6 | 0 | 8.0 | 4.5 | 5.2 |
|  |  | Ratio to All Voids [%] | 74 | 88 | 0 | 94 | 88 | 38 |
| Catalytic Performance | Nox Removal Ratio [%] |  | 22 | 26 | 17 | 17 | 15 | 15 |

*[1]Particles 1: Yttria-containing zirconia particles
Particles 2: Ceria-zirconia solid solution particles
Particles 3: Lanthana-containing alumina particles
*[2]Amount added to 100 mass parts of the total amount of Particles 1 to 3

As shown in Table 1, it was found that the catalysts for purification of exhaust gas having a catalyst coat layer with a predetermined void fraction and a predetermined ratio of high-aspect ratio pores (Examples 1 and 2) had a higher NOx removal ratios than that of the catalyst for purification of exhaust gas having a catalyst coat layer with no high-aspect ratio pores and a void fraction smaller than a predetermined range (Comparative Example 1). The present inventors infer that this is because in the catalysts for purification of exhaust gas of Examples 1 and 2, the gas diffused sufficiently into the catalyst coat layer because of the presence of high-aspect ratio pores in the catalyst coat layer, whereas in the catalyst for purification of exhaust gas of Comparative Example 1, the gas did not diffuse into the catalyst coat layer because of the absence of high-aspect ratio pores in the catalyst coat layer.

Furthermore, it was found that the catalyst for purification of exhaust gas having a catalyst coat layer in which the ratio of high-aspect ratio pores to all the voids was larger than a predetermined range (Comparative Example 2) had a lower NOx removal ratio than that of the catalysts for purification of exhaust gas having a catalyst coat layer with a predetermined ratio of high-aspect ratio pores (Examples 1 and 2). The present inventors infer that this is because in the catalyst for purification of exhaust gas of Comparative Example 2, the ratio of gas that passed through the catalyst coat layer coat layer, the catalytic effect was not fully exhibited in the portions where the noble metal was not supported.

In addition, the present inventors infer that this is because the catalyst for purification of exhaust gas having a catalyst coat layer with a void fraction larger than a predetermined range (Comparative Example 4) had a thicker catalyst coat layer, so that even though the void fraction was large, there were fewer opportunities for the gas to come into contact with the catalytically active sites.

INDUSTRIAL APPLICABILITY

As described above, the present invention makes it possible to obtain a catalyst for purification of exhaust gas which has a thin thickness of the catalyst coat layer and exhibits a relatively high catalytic performance even when the catalyst coating amount is increased. Therefore, the catalyst for purification of exhaust gas of the present invention is particularly useful as a catalyst for purifying harmful components such as NOx contained in gases discharged from internal combustion engines such as automobile engines.

The invention claimed is:

1. A catalyst for purification of exhaust gas comprising:
a substrate, and
a catalyst coat layer which is formed on a surface of the substrate and which contains catalyst particles, wherein the catalyst coat layer has an average thickness in a range of 25 to 150 μm, a void fraction, as determined by scanning electron microscope (SEM) observation of a cross-section of the catalyst coat layer, is in a range of 1.5 to 8.0% by volume, 60 to 90% by volume of all voids in the catalyst coat layer are high-aspect ratio pores which have equivalent circle diameters in a range of 2 to 50 μm in a cross-sectional image of a cross-section of the catalyst coat layer perpendicular to a flow direction of exhaust gas in the substrate, and which have aspect ratios of 5 or higher, the high-aspect ratio pores have an average aspect ratio in a range of 10 to 50, and a noble metal is supported on the entire catalyst coat layer.

2. The catalyst for purification of exhaust gas according to claim 1, wherein the void fraction of the catalyst coat layer is in a range of 1.6 to 7.0% by volume.

3. The catalyst for purification of exhaust gas according to claim 1, wherein 70 to 90% by volume of all the voids in the catalyst coat layer are the high-aspect ratio pores, and the high-aspect ratio pores have an average aspect ratio in a range of 10 to 35.

4. The catalyst for purification of exhaust gas according to claim 1, wherein the coating amount of the catalyst coat layer is in a range of 50 to 300 g/L per unit volume of the substrate.

5. The catalyst for purification of exhaust gas according to claim 2, wherein 70 to 90% by volume of all the voids in the catalyst coat layer are the high-aspect ratio pores, and the high-aspect ratio pores have an average aspect ratio in a range of 10 to 35.

6. The catalyst for purification of exhaust gas according to claim 2, wherein the coating amount of the catalyst coat layer is in a range of 50 to 300 g/L per unit volume of the substrate.

7. The catalyst for purification of exhaust gas according to claim 5, wherein the coating amount of the catalyst coat layer is in a range of 50 to 300 g/L per unit volume of the substrate.

* * * * *